US005953138A

United States Patent [19]
Ellis

[11] Patent Number: 5,953,138
[45] Date of Patent: Sep. 14, 1999

[54] ALL-OPTICAL PROCESSING IN COMMUNICATIONS SYSTEMS

[75] Inventor: Andrew David Ellis, Suffolk, United Kingdom

[73] Assignee: British Telecommunications public limited company, London, United Kingdom

[21] Appl. No.: 08/817,347

[22] PCT Filed: Oct. 19, 1995

[86] PCT No.: PCT/GB95/02471

§ 371 Date: Apr. 16, 1997

§ 102(e) Date: Apr. 16, 1997

[87] PCT Pub. No.: WO96/13104

PCT Pub. Date: May 2, 1996

[30] Foreign Application Priority Data

Oct. 19, 1994 [EP] European Pat. Off. .............. 94307665

[51] Int. Cl.⁶ ................. H04J 4/00; H04J 14/00
[52] U.S. Cl. .......... 359/123; 359/124; 359/135; 359/158
[58] Field of Search ............... 359/108, 123–124, 359/135, 140, 158, 161; 341/69

[56] References Cited

U.S. PATENT DOCUMENTS 5,604,618 2/1997 Mori et al. ............... 359/135
5,625,722 4/1997 Froberg et al. ........... 341/69

FOREIGN PATENT DOCUMENTS 0 409 660 1/1991 European Pat. Off. .
0 567 693 11/1993 European Pat. Off. .

OTHER PUBLICATIONS

Bigo, S. et al. "Bit–Rate Enhancement Through Optical . . . ", Electronics Letters, vol. 30, No. 12, Jun. 9, 1994, pp. 984–985.

Blow, K. J. et al., "Nonlinear Loop Mirror Devices and Applications", BT Technol. J., vol. 11, No. 2, Apr. 1993, pp. 99–107.

Dijaili, Sol P. et al., "Cross–Phase Modulation in a Semiconductor . . . ", IEEE Journal of Quantum Electronics, vol. 28, No. 1, Jan. 1, 1992, pp. 141–150.

Lacey, J.P.R. et al., "All–Optical WDM to TDM Transmultiplexer", Electronics Letters, vol. 30, No. 19, Sep. 15, 1994, pp. 1612–1613.

Patrick, D.M. et al., "20 Gbit/s Wavelength Conversion . . . ", Electronics Letters, vol. 30, No. 3, Feb. 3, 1994, pp. 252–253.

Patrick, D.M. et al., "Demultiplexing Using Polarisation . . . ", Electronics Letters, vol. 30, No. 4, Feb. 17, 1994, pp. 341–342.

*Primary Examiner*—Kinfe-Michael Negash
*Attorney, Agent, or Firm*—Nixon & Vanderhye P.C.

[57] ABSTRACT

An all-optical processing system coverts or interfaces optical signals from a wavelength division multiplexed (WDM) form to an optical time divisional multiplexed (OTDM) form. The initial WDM signal typically comprises a non-return to zero (NRZ) signalling format. The system includes a plurality of NRZ data modulated, cw optical WDM channels which are cross-phase modulated, and thus are spectrally broadened, in an optical non-linear element, by a strong clock pulse signal. The resultant signal comprises an RZ representation of the original NRZ signal. The RZ signal is temporally shifted by a dispersive element which temporally shifts each wavelength channel by a predetermined amount, to produce a wavelength-interleaved OTDM signal. The signal is then wavelength converted by cross-phase modulation with a cw control beam in a second non-linear optical element to provide a single wavelength OTDM signal.

15 Claims, 7 Drawing Sheets

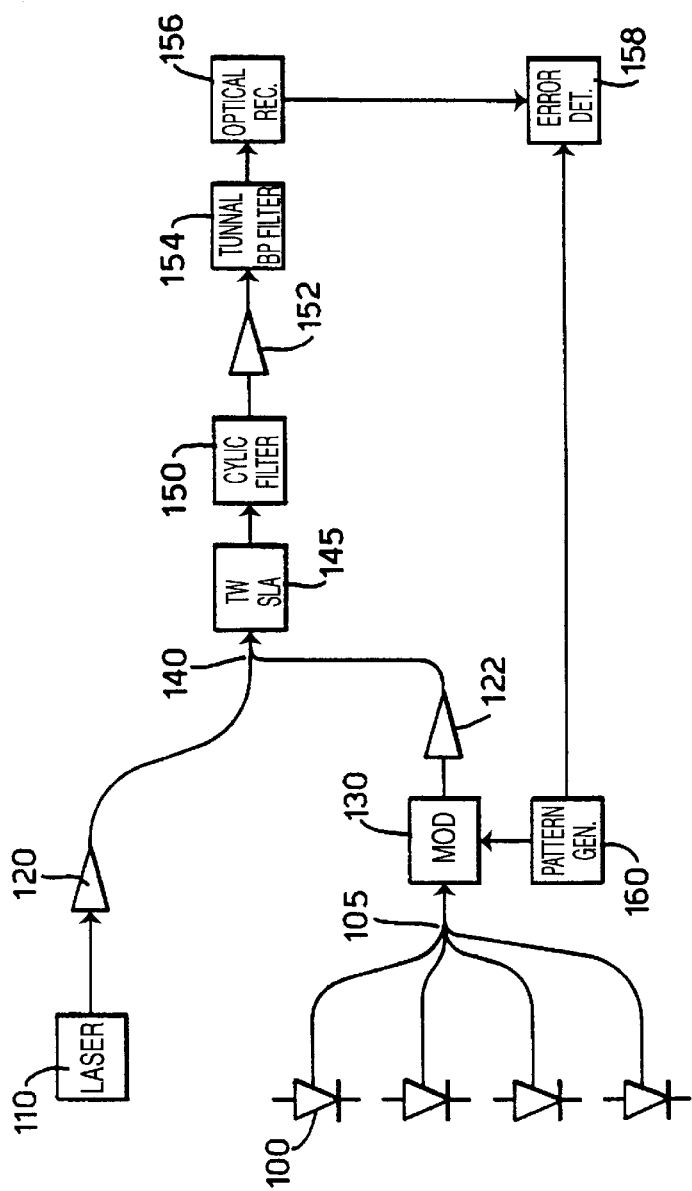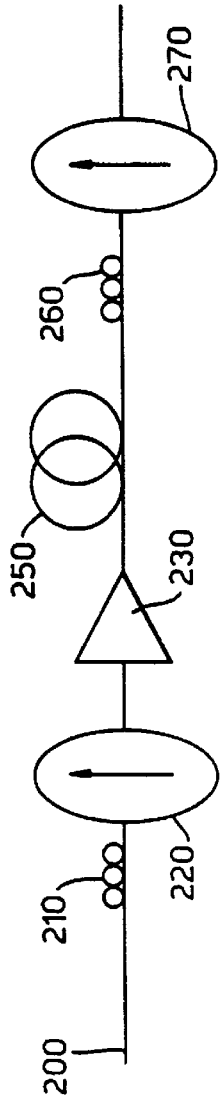

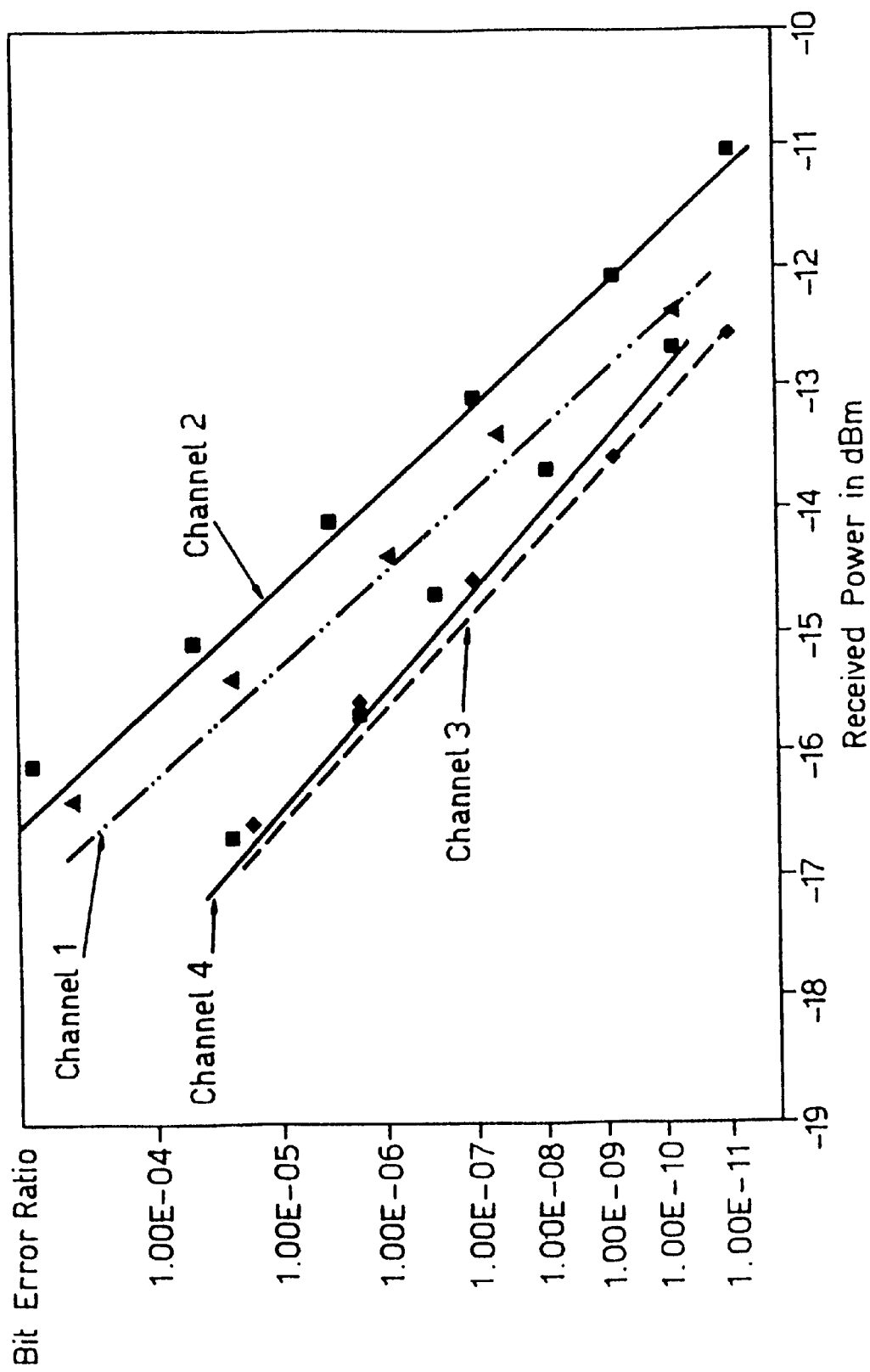

ALL-OPTICAL PROCESSING IN COMMUNICATIONS SYSTEMS

BACKGROUND OF THE INVENTION

1. Field of the Invention

This invention relates to optical processing apparatus and systems, and to methods of processing optical communication signals, and particularly to systems, methods and apparatus for manipulating wavelength division multiplexed optical signals.

2. Related Art

Optical fibres are an extremely efficient transmission medium. Presently, the capacity of optical fibre communications systems is limited by certain factors, including the way in which the optical fibre bandwidth is utilised, and the opto-electronic components required to control certain optical communication processing functions.

The first factor, that of bandwidth use, is generally addressed by the use of various multiplexing techniques, for example wavelength division multiplexing (WDM) or optical time division multiplexing (OTDM).

The second factor has been extensively investigated over the past six or seven years, the results being demonstrations of all-optical processing functions in optical fibres and semiconductor optical devices. An optical fibre communications network incorporating only all-optical processing functions would potentially provide communications capacity far beyond that which is currently available in optical fibre communications networks incorporating very much slower opto-electronic processing functions.

In terms of bandwidth usage, WDM networks have received considerable attention in recent years, and are likely to provide optical routing in, for example, a metropolitan or national network, where a large node density makes the simple passive demultiplexing (wavelength filtering) associated with WDM attractive. However, the combination of dispersion and fibre non-linearity potentially restricts the size of WDM networks, or the ability to expand WDM networks, if traditional signalling formats are employed. Therefore, presently OTDM is more likely to find application over wider geographical areas, with a smaller number of higher capacity optical switches, since a single wavelength, multiplexed channel system such as OTDM is not so susceptible to the detrimental effects non-linearity and dispersion as a WDM system, particularly when soliton transmission effects are employed to balance non-linearity against dispersion. Furthermore, gain flatness equalisation or pre-emphasis techniques are not an important consideration for single wavelength OTDM systems, whereas such techniques would be an important aspect of the design of a corresponding WDM system, considerably simplifying amplifier (or power) management.

Recognising the problems of scalability associated with WDM communications networks, but at the same time appreciating that WDM has many advantages, for example simple passive demultiplexing, the applicants have considered that in future there might be a need for an all-optical communications network which is potentially able to deal with WDM traffic (eg on a local scale), OTDM traffic (eg on international trunk routes), and soliton traffic (eg on information super-highways). To be effective, such an optical network would also need to be able to convert between any two of the traffic formats employed, otherwise universal interconnection to, and information interchange across, the network would be restricted.

Presently, generation and transmission of WDM, OTDM and soliton optical signalling formats is known and has been widely reported. Also, Lacey, et al. "All optical WDM to TDM transmultiplexer", Electronics Letters, Sep. 15, 1994, pp 1612–1613, proposes WDM to TDM conversion firstly by splitting the WDM signal into its constituent channels using wavelength selective filters and mixing each channel with a clock pulse in separate respective optical amplifiers. This has the effect that gain compression causes wavelength conversion and reduces the width of the WDM data pulses. Then, each channel is delayed by separate respective optical delay lines having different delays, and finally all the channels are remultiplexed using an optical coupler. Bigo, et al, "Bit-rate enhancement through optical NRZ-to-RZ conversion and passive time-division multiplexing for soliton transmission systems", Electronics Letters 1994, vol. 30, pp 984–985, proposes using an optical loop mirror as an AND gate for an NRZ data signal and a clock signal to provide NRZ to RZ conversion. Further, Bigo et al. proposes multiplexing a plurality of these AND outputs to provide bit-rate enhancement (TDM).

Throughout the present description, the terms "square" and "pulsed", with respect to wave forms, are intended to be synonymous and interchangeable with "NRZ" and "RZ" respectively.

SUMMARY OF THE INVENTION

According to a first aspect, the present invention provides apparatus for processing a wavelength division multiplexed optical signal, comprising:

input means to receive a first optical signal and a second optical signal, said first optical signal comprising at least two data channels of different wavelength and said second optical signal being of a single wavelength and comprising a stream of pulses, the pulses having a pulse repetition rate at least as high as the bit rate of the highest data rate data channel;

a non-linear optical element having input means to receive said first and second optical signals and output means to provide a third optical signal, the third optical signal being representative of a logical AND function of the first and second optical signals and comprising pulses each having wavelength components corresponding to the respective data channels; and means to apply a wavelength-dependent delay to each wavelength component of the third optical signal to provide a fourth optical signal.

This apparatus forms the first part of an overall apparatus for carrying out NRZ to RZ conversion.

By correctly placing the apparatus, for example, in a metropolitan area network (MAN), standard WDM NRZ signalling can be employed for all traffic within the MAN, whilst long-haul traffic, for example to a second, far-removed MAN can be routed across a soliton supporting communications link, by converting the NRZ format signal to a RZ format in accordance with the present invention, and subsequently to a soliton format signal by a known method. This approach has the advantage that all sources and wavelength converters/switches within each MAN need not necessarily be soliton compatible. Thus, advantageously, existing WDM infrastructure can be maintained, minimising the capital cost of installing the system.

The non-linear optical element preferably comprises a travelling wave semiconductor laser amplifier (TWSLA). In a TWSLA, a strong clock pulse signal is provided, having a pulse repetition rate at least as high as the highest bit-rate WDM channel, which periodically modulates the TWSLA carrier density, imposing cross-phase modulation (XPM) on WDM channels propagating through the amplifier. The result of the XPM is a spectrally-broadened WDM signal wherever the WDM signal is coincident with the clock pulse signal.

When the optical signals are spectrally broadened by XPM in a non-linear element, the apparatus preferably further comprises a cyclic filter downstream of the non-linear element to perform a frequency discrimination function. The cyclic filter eliminates the un-modulated background of the WDM channels so it should have regular pass and stop bands, with a good stop band extinction. Suitable filters include Mach Zehnder interferometers, Fabry Perot interferometers and birefringent filters.

One form of suitable cyclic filter is a birefringent fibre incorporating input and output polarisation control. The filter selects the required wavelengths by modifying the polarisations of each WDM channel in the fibre, so that the required wavelengths coincide with an output polariser. An arrangement of this type can provide excellent extinction with relatively broad pass-bands. The resulting filtered signal is substantially a WDM RZ, pulse signal representation of the WDM NRZ signal.

A significant advantage of incorporating an non-linear optical element into the apparatus of the present invention is that conversion from NRZ to RZ of all WDM channels is carried out simultaneously in a single element, and that the operating speed is limited by optical non-linearity rather than by the speed of alternative opto-electronic devices.

A significant advantage of using XPM in a TWSLA as the non-linear element is the intrinsic wavelength insensitivity of the TWSLA, and whilst similar XPM effects have been demonstrated in optical fibre, constraints imposed by chromatic dispersion in optical fibres preclude multi-channel operation over a wide wavelength range, although the use of dispersion-flattened fibre may alleviate some of these difficulties.

An alternative non-linear element to a TWSLA is a non-linear optical loop mirror (NOLM). In particular, a NOLM incorporating a semiconductor laser amplifier is preferred since fibre NOLMs may suffer from unwanted dispersion effects and phase matching problems.

A NOLM has an advantage over the method described above that a cyclic filter is not required since the cross-phase modulated signal portions are switched out of a different output from the non-cross-phase modulated signal portions, rather than being combined.

Other non-linear elements which could be used in place of a TWSLA or a NOLM include a polarisation rotation gate, a non-linear Mach Zehnder interference gate, a non-linear directional coupler, or a non-linear Fabry Perot interferometer. This list of alternatives is by no means exhaustive, and does not limit the choice to those alternatives listed. A further alternative, limited in processing speed, is electro-optic modulation using for example electro-absorption modulators to form the pulses.

In a preferred embodiment, the present invention further comprises shift means for temporally shifting each one of the discrete wavelength channels by a different predetermined amount to provide a wavelength-interleaved time division multiplexed (WITDM) signal.

In this way, a WDM signal (RZ format), is converted to a pseudo-OTDM signal which has the temporal form of an OTDM signal, but not the spectral form (that is, at this stage the signal comprises a series of pulses which sequentially cycle through the different wavelengths of the WDM signal).

The formation of a WITDM signal can be an intermediate step towards conversion to an OTDM signal, as described below.

The shift means preferably comprises a dispersive element, which provides a fixed amount of chromatic dispersion to delay each one of the discrete wavelength channels by a different amount; thus producing the WITDM signal.

The dispersive element could comprise a suitable length of standard optical fibre, however a pair of refraction gratings or other dispersive elements could be used instead. However, using a length of standard optical fibre has the advantage that the entire operation of converting from a purely wavelength multiplexed signal to a WITDM signal is achieved in a single optical fibre path. In contrast, in known systems, conversion from WDM to a time division multiplexed format would involve delaying individual channels each by a different amount using different delay lines, and then combining the delayed signals in an optical interleaver. Such systems may be unreliable since optical interleavers typically exhibit poor stability. There is also the greater cost of such systems to consider, compared to the cost of a length of standard optical fibre which can achieve the same effect. The length of optical fibre required is determined by the extent of temporal shifting required between WDM channels, and by the dispersion constant of the optical fibre.

The effect of the dispersion on the pulses in an optical fibre should be considered, and it would appear that lower dispersions would be required to reduce any unwanted temporal broadening, resulting in broad RZ pulses. It is perhaps fortunate, however, that the chirp experienced by pulses formed in a TWSLA can produce pulse compression in standard optical fibre in some circumstances. Thus, preferably, an optical fibre dispersive element both compresses and interleaves the pulses in a preferred scheme.

It will be appreciated that the use of dispersion, for example in a length of optical fibre, as described above, to provide a WITDM signal from a RZ format WDM signal, is not limited to use in accordance with the present invention. Indeed, a WDM signal (RZ format) may be provided by any source and the subsequently formed WITDM signal could be used in accordance with the present invention, or in any other apparatus requiring such a signal.

In a preferred embodiment, the present invention further comprises a second non-linear optical element for converting the WITDM signal to a single wavelength OTDM signal.

This second non-linear optical element can conveniently embody the features of the first non-linear optical element described above.

Therefore, preferably the second non-linear optical element comprises a second TWSLA which operates in a similar fashion to the operation of the first TWSLA, described above. However, in this case, the WITDM signal is arranged to phase-modulate a cw beam, and the cyclic filter is replaced by a bandwidth limiting filter, to isolate the resultant, single wavelength, OTDM signal.

Alternatively, the non-linear element can be any other suitable non-linear element, for example a NOLM or a Mach Zehnder Interferometer etc, as before.

In a still further embodiment, the speed of operation of a TWSLA, embodied in the second non-linear stage, can be increased by operating the amplifier in accordance with our co-pending European patent application number 93308066.5 (filed on Oct. 11, 1993), in which a third, pump, beam is injected into the TWSLA to suppress data patterning effects that may otherwise occur due to temporally non-uniform carrier density dynamics. The use of such a pump beam to pin the Fermi level and suppress data patterning, is described in further detail in the application mentioned, the disclosure of which is incorporated herein by reference.

An advantage of the present invention is that extremely spectrally pure data pulses are produced, without using a high specification pulse source. Normally, a pulse source used for producing OTDM signals requires both spectral purity and temporal stability, and hence is relatively expensive. However, in an apparatus according to the present invention, the clock pulse source needs only to provide pulses which are temporally stable, since the spectral purity is achieved through the second non-linear element and filter (if necessary) arrangement. Therefore, the light source for the OTDM system can be a relatively cheap DFB laser. Alternatively, if a high speed pulse source is available, a second converter may be used to modulate the pulse stream.

A further advantage of the present invention is that all the active components can be semiconductor components, for example TWSLAs, which allows scope for integration (although development of an on-chip cyclic filter and a dispersive element would be required).

According to further aspects, the present invention also provides methods and systems as described in more detail in the claims.

BRIEF DESCRIPTION OF THE DRAWINGS

The present invention will now be described, by way of example only, which reference to the accompanying drawings, of which:

FIG. 1 is an experimental system to demonstrate conversion of a four channel WDM signal carrying NRZ data to a WDM signal carrying RZ data;

FIG. 2 shows a polarisation filter arrangement used in the system of FIG. 1;

FIG. 6 shows BER measurement comparisons for the system in FIG. 1;

DETAILED DESCRIPTION OF EXEMPLARY EMBODIMENTS

Figure 3:
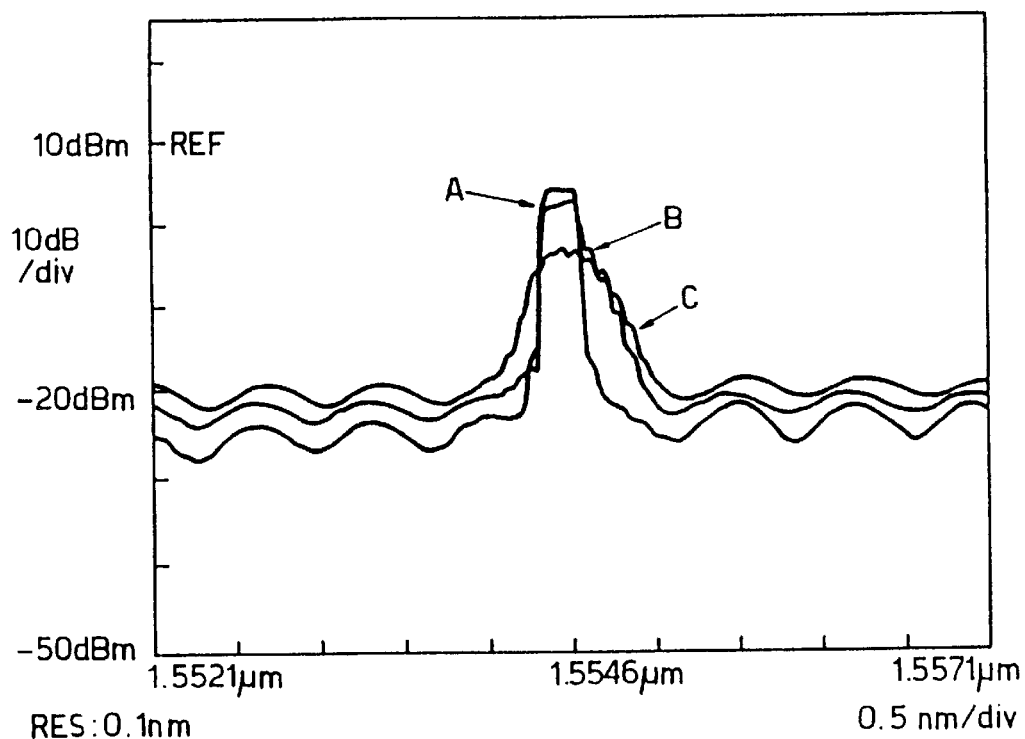
FIG. 3 shows the stages of spectral broadening for a single NRZ pulse.

The system of FIG. 1 is used to generate a four-channel NRZ format, WDM optical signal, to demonstrate conversion of the signal to a corresponding RZ format signal. In the system of FIG. 1, a clock signal comprising equally spaced optical pulses is generated by an external cavity semiconductor laser 110 (1545 nm) mode-locked at 10 GHz, with a pulse width of 13 ps (assuming a Gaussian pulse shape) and a time-bandwidth product of ~0.45.

Four cw channels (1554.2 nm, 1556 nm, 1557 nm, 1558.4 nm) are generated by four cw DFB laser diodes 100. The channels are combined by a 4-to-1 fibre coupler 105 and, for the purposes of demonstration, are modulated with a single 10 Gbit/s $2^7-1$ PRBS using a lithium niobate ($LiNbO_3$) intensity modulator 130, driven by a suitable pattern generator 160.

The clock and NRZ format data signals are amplified in optical amplifiers 120 and 122, for example erbium doped optical fibre amplifiers, and are fed into a TWSLA 145 through a WDM coupler 140. The clock signal is amplified to around 12 dBm, and the NRZ signal is amplified to between 1 to 3 dBm. The TWSLA 145 is a bulk device, with a coupling loss of ~6 dB per facet. Although a TWSLA provides XPM, any element providing a similar function would be suitable, in this case.

A cyclic filter 150 (described in more detail below, with reference to FIG. 2) which is implemented using polarisation rotation in a birefringent fibre, performs a frequency discrimination function downstream of the TWSLA 145 to process all four channels simultaneously. The filter cycle is ~0.7 nm, and the extinction ratio is about 30 dB. Essentially, the filter 150 removes the unperturbed parts of the data signals (the background components) passing signals that are coincident with, and therefore chirped by, the clock signal.

Finally, a 0.5 nm tuneable band pass filter 154 selects one of the four RZ channels, for bit-error-rate (BER) measurement purposes. An error detector 158 compares signals selected by the band pass filter 154 and received by an optical receiver 156, with copies of the signals from the pattern generator 160.

The results of the BER measurements for each of the channels in turn are described below with reference to FIG. 6.

With reference to FIG. 2, the cyclic filter 150 comprises an input 200 to a combination of a polarisation controller (PC) 210 and a polariser 220. The PC 210 and the polariser 220 are tuned to ensure that an optical signal entering the filter has a well-defined polarisation. The PC 210 is included to enable fine adjustment of the input polarisation.

An optical amplifier 230, downstream of the polariser 220, is included to compensate for signal losses due to the initial polarisation selection stage. Any form of optical amplifier can be used, although a suitable length of erbium-doped optical fibre is preferred.

The optical signal, having passed through the polarisation selection stage, has a well-defined polarisation. In the filter 150, the periodic spectral shifts imposed on the reference beam by the data pulses in the TWSLA 145 experience a wavelength-dependent polarisation rotation in a birefringent element 250 positioned downstream of the amplifier 230. The birefringent element 250 in this case is a birefringent fibre which has a length of 100 m and a polarisation mode dispersion of 10 ps. By optimising a polarisation controller 260, which is positioned downstream of the birefringent fibre 250, the spectrally un-shifted component of the wave form is blocked by a polariser 270 positioned downstream of the polarisation controller 260, resulting in the transmission of 10% of the light incident on that polariser. The 10% of the light consists of a train of wavelength-converted pulses, where the pulses effectively correspond to a RZ representation of the original signal.

Other known types of wavelength filtering arrangement can easily replace the cyclic filter arrangement described, for example Mach Zehnder interferometers or Fabry Perot interferometers.

FIG. 3 shows the spectral broadening stages of one selected NRZ channel. Trace A represents the un-broadened NRZ channel, trace B represents the NRZ channel spectrally broadened by a clock pulse, and trace C shows the cw component removed by the cyclic filter.

Figure 4:
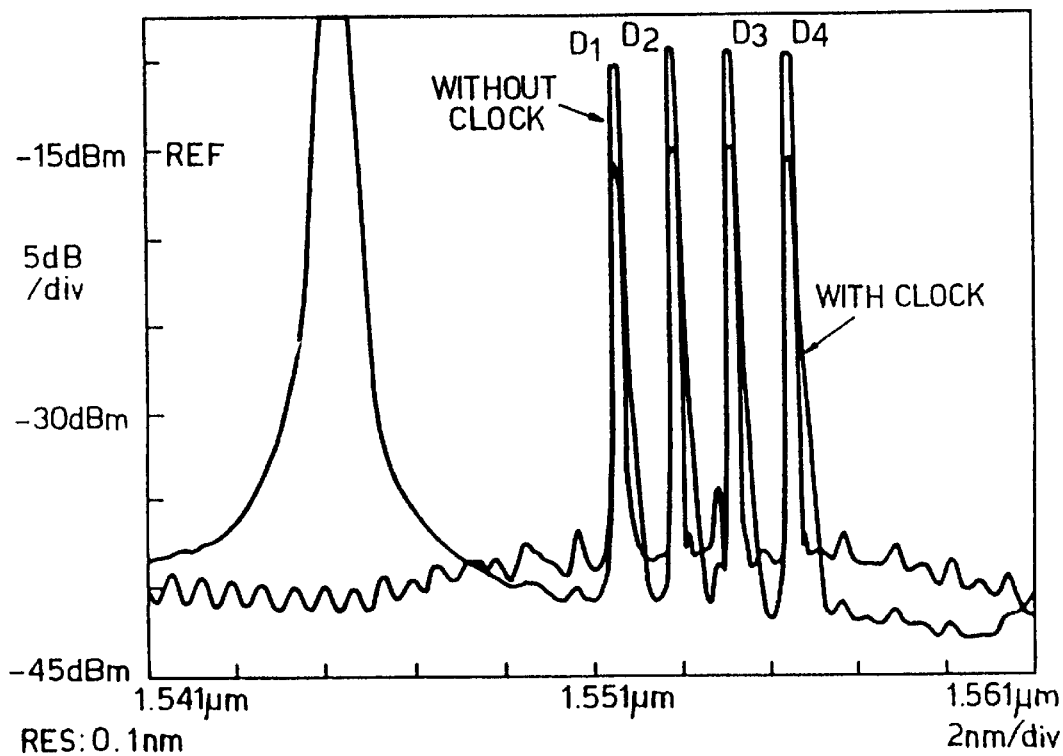
FIG. 4 shows spectral transformations for four RZ wavelength channels.
Figure 5A:
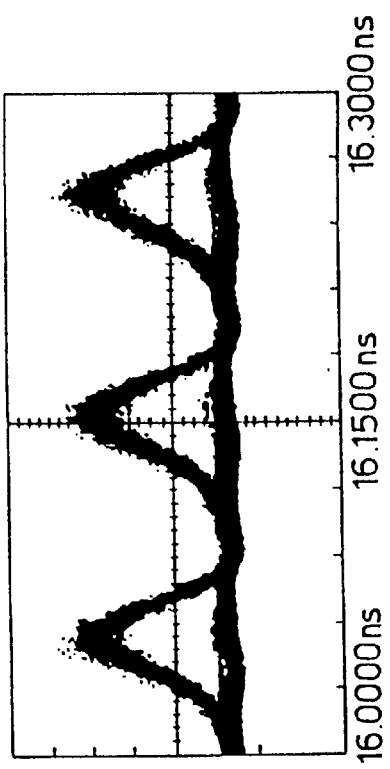
FIGS. 5A–5D show eye diagrams for the four RZ pulse wave forms.
Figure 5B:
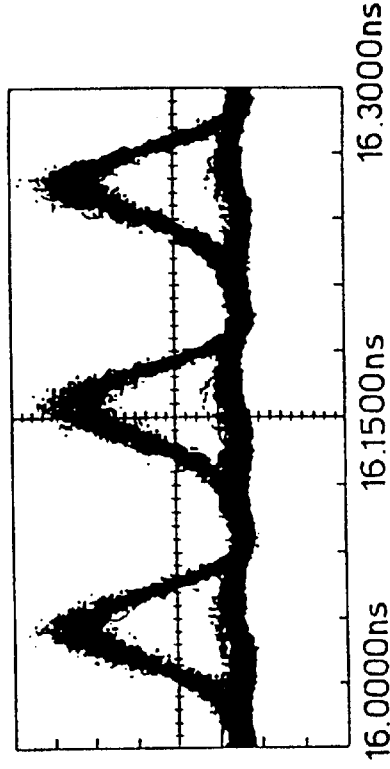
Figure 5C:
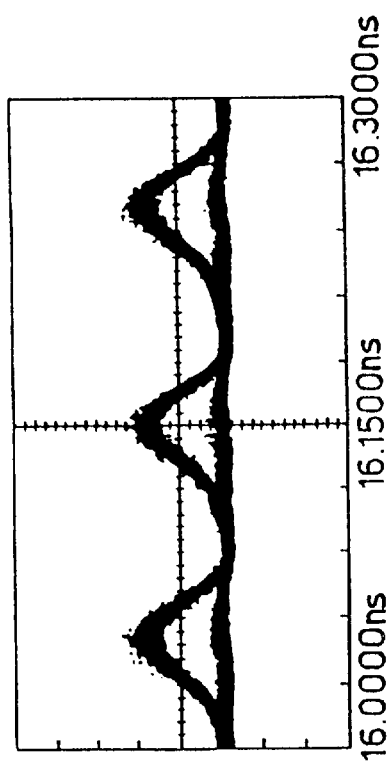
Figure 5D:
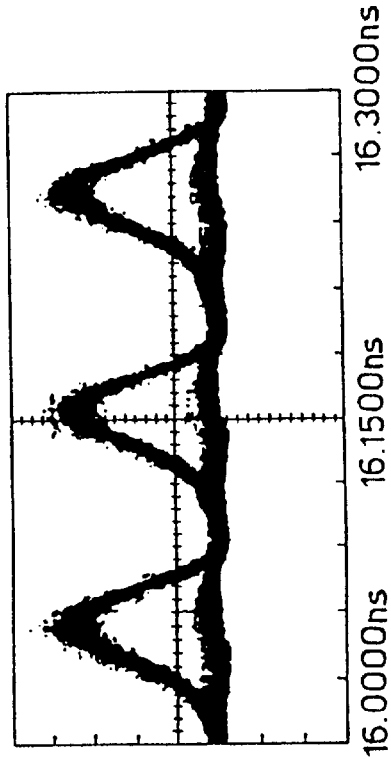

In FIG. 4, the spectral peaks at the DFB wavelengths ($D_x$), with and without the clock wave form, are the unconverted residual NRZ signals which are removed by the cyclic filter when its stop bands are aligned with the peaks.

FIGS. 3 and 4 show that the spectral broadening is asymmetric, being biased to the longer wavelength side due to the gain recovery mechanism in the TWSLA 145. Because of the asymmetry in spectrum, it is possible to remove the un-broadened parts with only ~5 dB insertion loss for the broadened signals. The alignment of the four wavelengths with respect to the filter pass bands is realised by a fine tuning of both the temperature and bias current of the DFBs 100.

FIGS. 5A–5D show eye diagrams for all four wavelength channels. As can be seen, the diagrams do not show patterning effects, which are completely suppressed by the strong clock signal. The pulse widths of the converted RZ signals are ~15 ps (assuming Gaussian pulse shape) which is very close to the clock pulse width of ~13 ps.

To demonstrate the low noise characteristics of the converted RZ signals, BER measurements are carried out for all four channels, the results of which are shown in FIG. 6. The receiver 156 sensitivity (@BER=$10^{-9}$) spread among the 4 channels is ~1.5 dB, and there is no noticeable error floor at BER=$10^{-11}$, illustrating the excellent performance of the scheme.

Figure 7:
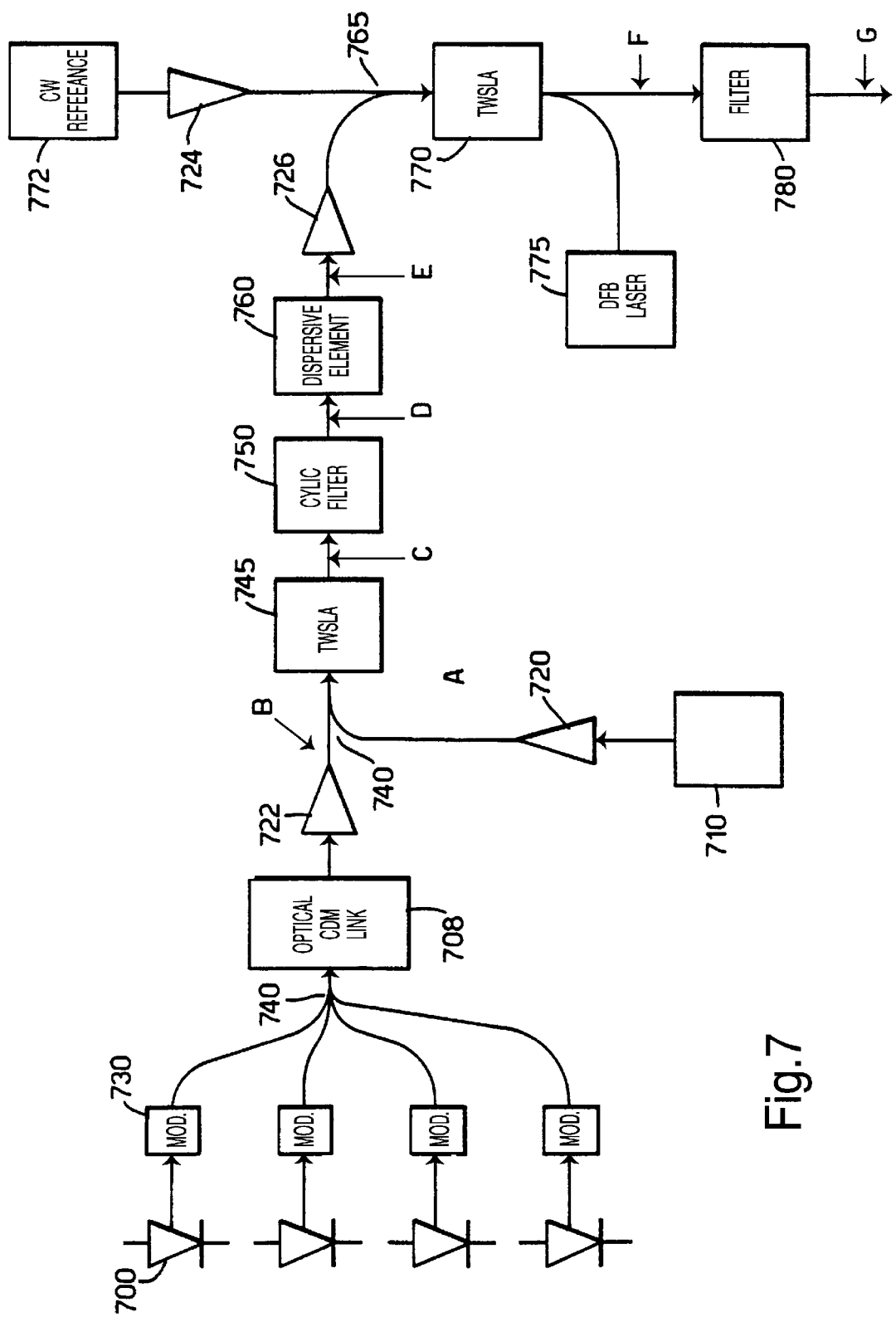
FIG. 7 is system representation suitable for full WDM to OTDM signal conversion.

FIG. 7 illustrates a system suitable for converting four NRZ optical signals at different wavelengths into a single OTDM channel.

In the system, a clock signal comprising equally spaced optical pulses is generated by an external cavity semiconductor laser 710 (1545 nm) mode-locked at 10 GHz, with a pulse width of 13 ps (assuming Gaussian pulse rate) and a time-bandwidth product of ~0.45.

Four WDM format NRZ channels (1554.2 nm, 1556 nm, 1557 nm, 1558.4 nm) are generated by four cw DFB laser diodes 700, which produce beams which are modulated by individual modulators 730 (to model four separate wavelength channels). The four channels are combined by a 4 to 1 WDM fibre coupler 705. The combined signal is then preferably passed into an optical element 708 which simulates the effects of an optical communications link, for example by dispersing and attenuating the signal. In practice, a link may be thousands of kilometres long, and may include one or more stages of amplification, signal regeneration, and/or switching. Thus, the parameters of the element 708 may be varied to simulate different link parameters. The element 708 may comprise combinations of different types of optical fibre, dispersive elements and maybe loop mirrors, however, the actual arrangement depends on the effects to be simulated. For the purposes of demonstration, optical element 708 may be omitted from the system altogether.

The clock and NRZ format WDM data signals are amplified in erbium doped optical fibre amplifiers 720 and 722 which provide the necessary signal levels for subsequent stages: the clock signal is amplified to around 12 dBm and the NRZ format signal between 1 to 3 dBm. The signals are then fed into a TWSLA 745 through a WDM coupler 740. The TWSLA 745 is a bulk device, with a coupling loss of ~6 dB per facet.

A cyclic filter 750 (described above, with reference to FIG. 2), which is implemented using polarisation rotation in a birefringent fibre, performs a frequency discrimination function downstream of the TWSLA 745 to process all four channels simultaneously. The filter cycle is ~0.7 nm, and the extinction ratio is about 30 dB. Essentially, the filter 750 removes the unperturbed part of the data signals (the background component) passing signals that are coincident with, and therefore chirped by, the clock signal.

The output of the cyclic filter 750 is dispersed by a dispersive element 760, this element being a length of standard optical fibre. For WDM channels 1.4 nm apart, 25 ps delay between adjacent channels requires 17.8 ps/nm of dispersion, which is provided by around 1 km of standard optical fibre. Alternatively, any length of suitably dispersive optical fibre, which provides the required amount of dispersion, could be used.

The dispersed signal is amplified by an amplifier 726 and is fed into a second TWSLA 770, through a WDM coupler 765, along with a cw reference signal amplified by an amplifier 724 and originating from an optically amplified DFB semiconductor laser 772. The WDM pulse stream is amplified to a mean optical power of +12 dBm and the co-propagating cw reference signal is amplified to a mean optical power of 4.9 dBm.

Optionally, a separate optically amplified counter-propagating (or co-propagating) cw DFB pump beam is injected into the second TWSLA 770, from a DFB semiconductor laser 775, to suppress the data patterning effects that might otherwise occur due to temporally non-uniform carrier density dynamics.

The second TWSLA 770 is a polarisation insensitive bulk-layer device with a peak wavelength of 1.54 µm, operating with a DC bias current of 200 mA. A filter element 780 positioned downstream of the TWSLA 770, comprises a tuneable band pass filter and polariser which is used to eliminate the residual amplified spontaneous emission and to define the polarisation of the reference signal at the output of the TWSLA 770. The filter 780 is typically similar to the cyclic filter 150 described above with reference to FIG. 2. However, for this filter, emphasis is placed on a single accurate pass band and strong rejection about the required output signal wavelength, rather than on four equally efficient pass and rejection bands.

Figure 8A:
FIGS. 8A to 8G are idealised graphical representations of the signal spectra at points in the system of FIG. 7.
Figure 8B:
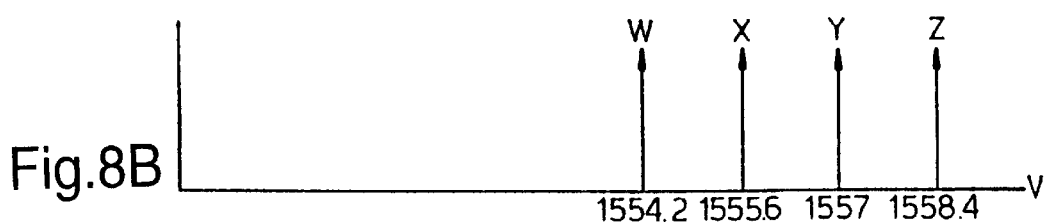
Figure 8C:
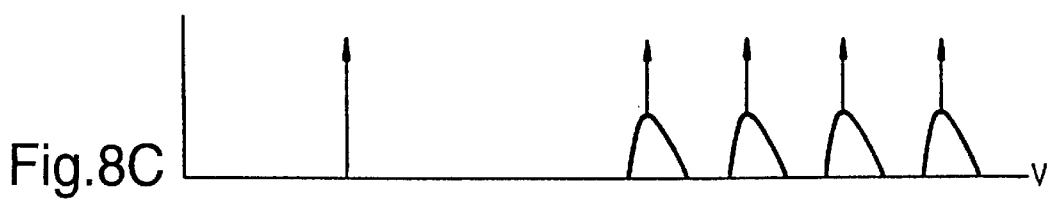
Figure 8D:
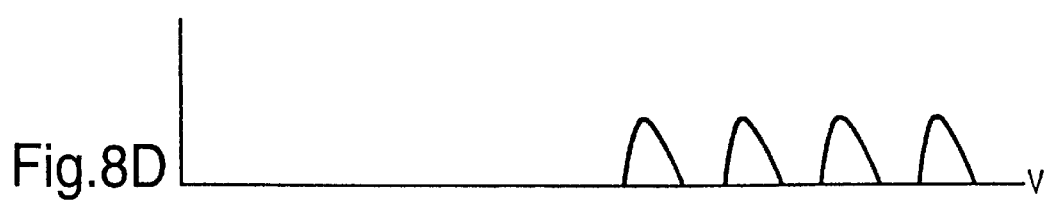
Figure 8E:
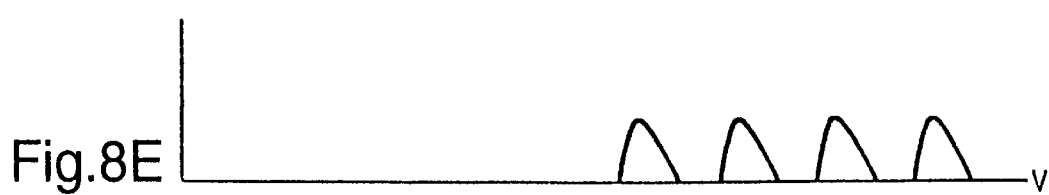
Figure 8F:
Figure 8G:

FIGS. 8A to 8G represent the spectra of the pulsed clock signal (designated CL) and the four wavelength channels (designated W, X, Y, Z) present at corresponding locations A to G on FIG. 7. As can be seen, the four channels (W=1554.2 nm, X=1555.6 nm, Y=1557 nm and Z=1558.4 nm) in FIG. 8B are wavelength broadened, as represented in FIG. 8C, by the pulse clock signal (1545 nm) shown in FIG. 8A. FIGS. 8D and 8E show the channels having been stripped of their cw background component by the filtering. FIG. 8F represents the four channels after wavelength conversion by the cw reference signal in the second TWSLA 770, to a single wavelength OTDM signal. FIG. 8G represents the resultant OTDM signal at 1545 nm, after the cw background of the reference signal has been filtered away.

Figure 9A:
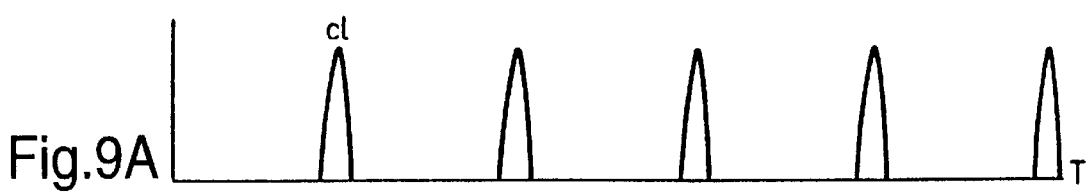
FIGS. 9A to 9G are idealised graphical representations of the time-varying amplitude signal wave forms at points in the system of FIG. 7.
Figure 9B:
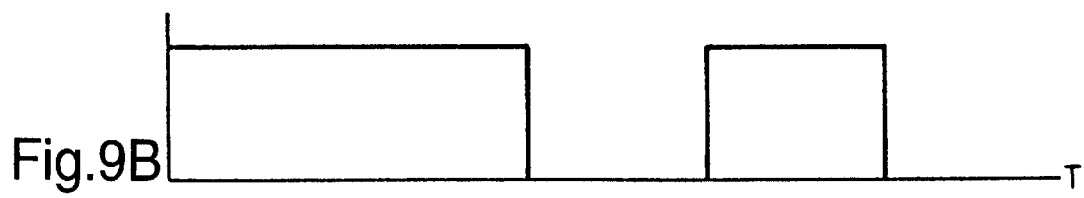
Figure 9C:
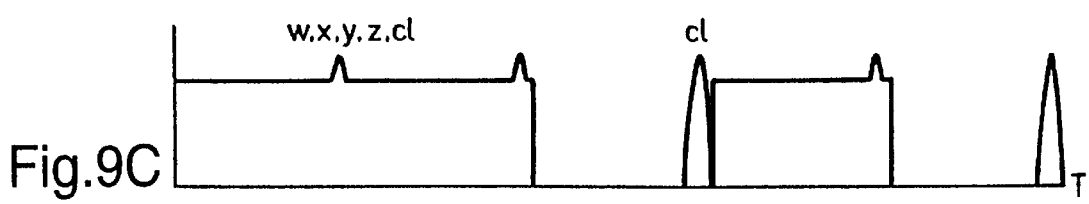
Figure 9D:
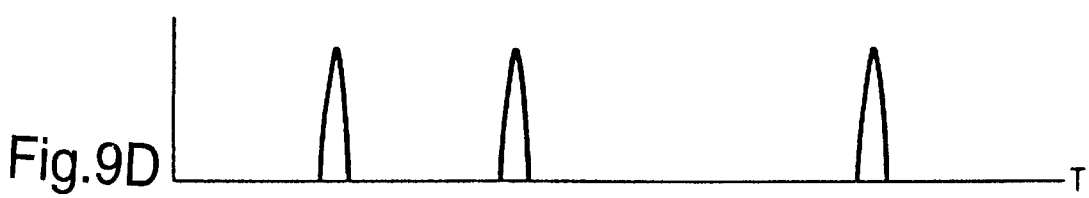

FIGS. 9A to 9G represent the time-varying characteristics of the clock and four channels (designated cl, w, x, y, z) which correspond to the same points A to G on FIG. 7. FIG. 9A represents pulsed clock signal. FIG. 9B represents a data pattern superimposed onto all four channels (all data patterns are the same for each channel for the sake of clarity). FIG. 9C represents the output of the first TWSLA 745 which comprises components of the data pattern and the clock pulse signals. The figure shows an idealised superposition of wave forms where the signals coincide, which in practice would more closely resemble a disturbance, or glitch, in the data pattern. The output of the filter 750 is represented in FIG. 9D. It can be seen in this figure that all but the perturbed (cross-phase modulated) portions of the wave form are filtered out, leaving a pulse train corresponding to a RZ representation of the original NRZ signal.

Figure 9E:
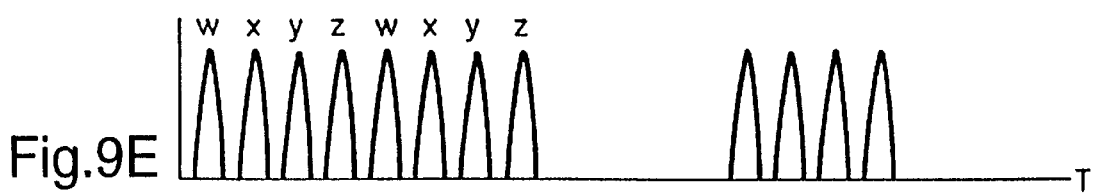
Figure 9F:
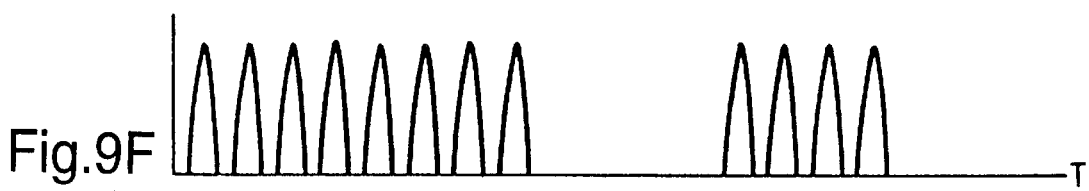
Figure 9G:
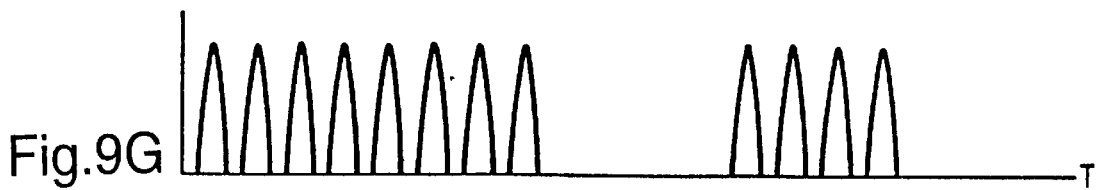

The effect of the dispersive element 760 to disperse each wavelength channel by a different amount is shown in FIG. 9E, where the WDM RZ pulse train is converted to interleaved pulses w, x, y, z at the different channel wavelengths. This pulse pattern remains the same throughout the remaining system, wherein only the spectral compositions of the pulses vary in accordance with FIGS. 8A to 8D.

As the skilled person will appreciate, the systems in FIGS. 1 and 7 relate only to possible ways of carrying out the present invention. Particularly, the non-linear elements described could be realised by alternative devices or arrangements of devices other than TWSLAs which provide a similar effect, for example NOLMs. In fact, the devices described in each stage of the invention (the non-linear element, the dispersive element, and the second non-linear element) can each be realised in a variety of ways, without falling outside the bounds of the present invention.

Also, all signal levels, signal frequencies, repetition rates and device bias currents etc, are provided by way of example, and are not essential features of the present invention.

Furthermore, it will be appreciated by the skilled person that the type of optical amplification (if any), and the exact positioning of optical amplification stages in the systems described, depends entirely on the arrangements and types of devices used, and as such is not an essential aspect of the present invention.

What is claimed is:

1. Apparatus for processing a wavelength division multiplexed optical signal, comprising:

input means to receive a first optical signal and a second optical signal, said first optical signal comprising at least two data channels of different wavelength and said second optical signal being of a single wavelength and comprising a stream of pulses, the pulses having a pulse repetition rate at least as high as the bit rate of the highest data rate data channel;

a non-linear optical element having input means to receive said first and second optical signals and output means to provide a third optical signal, the third optical signal being representative of a logical AND function of the first and second optical signals and comprising pulses each having wavelength components corresponding to the respective data channels; and means to apply a wavelength-dependent delay to each wavelength component of the third optical signal to provide a fourth optical signal.

2. Apparatus according to claim 1, wherein the delay means comprises a dispersive element for providing chromatic dispersion.

3. Apparatus according to claim 2, wherein the dispersive element comprises a length of optical fibre member.

4. Apparatus according to claim 1, further comprising a cyclic filter, downstream of the optical element, having a pass-band substantially centred at each of the different wavelength components of the third optical signal.

5. Apparatus according to claim 4, wherein the cyclic filter comprises a birefringent element.

6. Apparatus according to claim 1, further comprising:

a second non-linear optical element to receive the fourth optical signal and a fifth optical signal, the fifth optical signal comprising a stream of pulses having a single wavelength and having a pulse repetition rate at least equal to the pulse repetition rate of the second optical signal multiplied by the number of data channels; and output means to provide a sixth optical signal, the sixth optical signal comprising optical pulses of a single wavelength representative of a logical AND function of the fourth and fifth optical signals.

7. An apparatus according to claim 1, wherein the or at least one of the non-linear optical elements comprises a semiconductor laser amplifier.

8. An apparatus according to claim 1, wherein the or at least one of the non-linear optical elements forms part of an optical loop mirror.

9. An apparatus according to claim 1, wherein the or at least one of the non-linear optical elements comprises an electro-optic modulator having an electrical clock input means.

10. An optical communications system comprising a first optical fibre transmission path for carrying a wavelength division multiplexed optical signal, a second optical fibre transmission path for carrying a time division multiplexed optical signal and means connecting the first and second transmission paths for converting a wavelength division multiplexed signal into a time division multiplexed signal, said means for converting comprising apparatus according to claim 1.

11. An optical processing system for converting an input optical data signal comprising a plurality a discrete wavelength square wave data channels to an output optical data signal comprising a single wavelength time division multiplexed pulsed signal, said system comprising:

a first non-linear optical device arranged to receive the input signal and a first clock signal and to provide an output optical pulsed signal representation of the original square wave signal, said input signal comprising a plurality of discrete wavelength square wave data channels having a relatively low optical power and said clock signal comprising a pulse train having a frequency at least as high as the highest data rate data channel and a relatively high optical power;

means to temporally disperse the different wavelength components of the output optical signal by respective pre-determined amounts to provide a wavelength-interleaved output optical pulsed signal; and a second non-linear optical device arranged to receive the resultant output optical pulsed signal and a second clock signal, and to provide a single-wavelength output optical pulsed signal, said input signal having a relatively low optical power and said clock signal comprising a pulse train having a frequency substantially equal to that of the pulsed signal and a relatively high optical power.

12. A method for processing a wavelength division multiplexed optical signal, comprising the steps of:

introducing a first optical signal and a second optical signal, into a non-linear optical element, said first optical signal comprising at least two data channels of different wavelength and said second optical signal being of a single wavelength and comprising a stream of pulses, the pulses having a pulse repetition rate at least as high as the bit rate of the highest data rate data channel, the optical processing means being arranged to provide a pulse stream representative of a logical AND function of the first and second optical signals, where each pulse includes wavelength components corresponding to the respective data channels; and applying a wavelength-dependent delay to the third signal to provide a fourth, delayed, optical signal.

13. A method according to claim 12, wherein the first input signal comprises a plurality of discrete wavelength square wave data channels.

14. A method according to claim 12, further comprising the step of introducing the fourth and a fifth optical signal into a second non-linear optical element to provide a sixth optical signal, the fifth optical signal comprising a stream of pulses having a single wavelength and having a pulse repetition rate at least equal to the pulse repetition rate of the second optical signal multiplied by the number of data channels, the sixth optical signal comprising optical pulses of a single wavelength representative of a logical AND function of the fourth and fifth optical signals.

15. A method of producing a multiple channel pulsed data signal from a multiple channel square wave data signal, said method comprising the steps of:
 introducing a multiple channel square wave data signal into a non-linear optical device;
 introducing a pulsed clock signal having a repetition frequency at least as high as the highest data rate square wave data channel into the device; and
 arranging the respective signal power levels to provide an output data signal including perturbed data signal portions resulting from cross phase modulation of the data and clock signals, said perturbed data signal portions corresponding to a pulsed signal representation of the square wave data channels.

* * * * *